United States Patent
Nott et al.

(10) Patent No.: US 12,204,295 B2
(45) Date of Patent: Jan. 21, 2025

(54) DIGITAL ASSISTANT USING ROBOTIC PROCESS AUTOMATION

(71) Applicant: UiPath, Inc., New York, NY (US)

(72) Inventors: Brandon Nott, Bellevue, WA (US); Umesh Amin, Redmond, WA (US); Thomas Merkle, Boise, ID (US)

(73) Assignee: UiPath, Inc., New York, NY (US)

( * ) Notice: Subject to any disclaimer, the term of this patent is extended or adjusted under 35 U.S.C. 154(b) by 359 days.

(21) Appl. No.: 17/489,995

(22) Filed: Sep. 30, 2021

(65) Prior Publication Data
US 2023/0101223 A1    Mar. 30, 2023

(51) Int. Cl.
*G05B 13/02* (2006.01)
*G05B 19/4155* (2006.01)
*G06Q 40/12* (2023.01)

(52) U.S. Cl.
CPC ..... *G05B 13/0265* (2013.01); *G05B 19/4155* (2013.01); *G06Q 40/12* (2013.12); *G05B 2219/50391* (2013.01)

(58) Field of Classification Search
None
See application file for complete search history.

(56) References Cited

U.S. PATENT DOCUMENTS

| 10,963,231 B1* | 3/2021 | Singh | G06Q 10/063 |
| 2018/0197123 A1* | 7/2018 | Parimelazhagan | G06Q 10/0633 |
| 2020/0206920 A1* | 7/2020 | Ma | G06F 18/23213 |
| 2021/0110345 A1* | 4/2021 | Iyer | G06Q 10/0633 |
| 2021/0146537 A1* | 5/2021 | Bannoura | G06F 21/604 |
| 2021/0182996 A1* | 6/2021 | Cella | G06N 3/047 |

FOREIGN PATENT DOCUMENTS

KR    1020200015616 A    2/2020

OTHER PUBLICATIONS

International Search Report & Written Opinion, issued Jun. 22, 2022, PCT Application No. PCT/US21/56963.
Almato, Automate Business Processes with RPA, Raas or iRPA and Reduce Employee's Workload, retrieved from the Internet Jun. 11, 2021, https://www.almato.com/en/automation.
Automation Anywhere Unveils AARI—The First Digital Assistant at Work, retrieved from the internet Jun. 11, 2021, https://www.automationanywhere.com/company/press-room/automation-anywhere-unveils-aari-the-first-digital-assistant-at-work.
AutomationEdge Virtual Assistant—Smart Digital Agent to Speak Your Language, retrieved from the internet Jun. 11, 2021, https://automationedge.com/automationedge-virtual-assistant/.
(Continued)

*Primary Examiner* — Fateh M Obaid
(74) *Attorney, Agent, or Firm* — LeonardPatel PC; Sheetal S. Patel; Michael A. Leonard, II

(57) ABSTRACT

A digital assistant may execute one or more tasks using robotic processing automation (RPA). The digital assistant (or robot) assigns a workflow to a robot to monitor for one or more triggers. The one or more triggers comprise one or more events causing a robot to perform an automated tasks with or without user involvement. The robot also identifies the one or more triggers during the monitoring of the one or more triggers, and loads a workflow associated with the one or more identified triggers. The robot further includes executing the loaded workflow to perform one or more tasks associated with the one or more triggers.

31 Claims, 8 Drawing Sheets

(56) References Cited

OTHER PUBLICATIONS

Humley, Enhancing Your RPA Deployment with AI Assistants, retrieved from the internet Jun. 11, 2021, https://humleyai.com/rpa/.

Meet NEVA—NICE's Robotic Desktop Automation Tool, retrieved from the internet Jun. 11, 2021, https://www.nice.com/rpa/neva-attended-automation.

Mhaske, Prof. Harshada, et al., "Development of PrimeBot as an Assistant to HR in Recruitment Process Using RPA", International Journal of Engineering Research & Technology (IJERT), ISSN 2278-0181, vol. 8, Issue 5, May 2019.

* cited by examiner

Fig. 7

Email From UiPath™ Robot:

Hey Customer,

Here are times that would work for the team:

1. 10:30-11:00am 7/12/21

2. 3:30-3:00pm 7/12/21

3. 4:00-4:30pm 7/12/21

Please respond to this email with the corresponding number that works for you, comma delimited. For example simply respond with: 1,2 and I'll take it from there!

From,
Your friendly neighborhood UiPath Robot

Fig. 8

Email Reply from
External User:

1, 3

DIGITAL ASSISTANT USING ROBOTIC PROCESS AUTOMATION

FIELD

The present invention generally relates to robotic process automation (RPA), and more specifically, to a digital assistant using RPA.

BACKGROUND

Fully automated personal digital assistants do not currently exist. For example, digital assistants, such as Siri™ and Alexa™, are activated only when called upon by stating "Hello Siri™, please schedule a meeting for . . . ". These digital systems do not, however, operate in the background searching or waiting for triggers (or keywords) that would initiate workflows to execute one or more tasks without human involvement.

Accordingly, an improved method for providing a digital assistant using RPA may be beneficial.

SUMMARY

Certain embodiments of the present invention may provide solutions to the problems and needs in the art that have not yet been fully identified, appreciated, or solved by current personal digital assistant technologies. For example, some embodiments of the present invention pertain to fully automated personal digital assistant using RPA.

In an embodiment, a computer-implemented method for executing one or more tasks using robotic processing automation (RPA) includes assigning a workflow to a robot to monitor for one or more user actions or events via one or more triggers. The one or more trigger causes a robot to perform an automated tasks with or without user involvement. The method include identifying, by the robot, one or more relevant triggers. The one or more relevant triggers are coded in advance or determined by machine learning (ML) or artificial intelligence (AI) to be relevant. The method includes monitoring, by the robot, the one or more user actions and/or the events that satisfy the triggers. The method also includes loading, by the robot, a partial or full workflow associated with the one or more identified triggers. The method further includes executing, by the robot, the loaded workflow to perform one or more tasks associated with the one or more triggers.

In another embodiment, a computer program is embodied on a non-transitory computer-readable medium. The computer program is configured to cause at least one processor to execute one or more tasks using robotic processing automation (RPA). The computer program is further configured to cause the at least one processor to assign a workflow to a robot to monitor for one or more user actions or events via one or more triggers. The one or more trigger causes a robot to perform an automated tasks with or without user involvement. The computer program is further configured to cause the at least one processor to identify, by the robot, one or more relevant triggers. The one or more relevant triggers are coded in advance or determined by machine learning (ML) or artificial intelligence (AI) to be relevant. The computer program is further configured to cause the at least one processor to monitor, by the robot, the one or more user actions and/or the events that satisfy the triggers. The computer program is further configured to cause the at least one processor to load, by the robot, a partial or full workflow associated with the one or more identified triggers. The computer program is further configured to cause the at least one processor to execute, by the robot, the loaded workflow to perform one or more tasks associated with the one or more triggers.

In yet another embodiment, a system is configured to execute one or more tasks using robotic processing automation (RPA). The system includes memory configured to store one or more computer-executable instructions, and also includes at least one processor configured to execute the one or more instructions to perform one or more tasks. For example, the at least one processor configured to execute assign a workflow to a robot to monitor for one or more user actions or events via one or more triggers. The one or more trigger causes a robot to perform an automated tasks with or without user involvement. The at least one processor configured to execute identifying, by the robot, one or more relevant triggers. The one or more relevant triggers are coded in advance or determined by machine learning (ML) or artificial intelligence (AI) to be relevant. The at least one processor configured to execute monitoring, by the robot, the one or more user actions and/or the events that satisfy the triggers. The at least one processor configured to execute loading, by the robot, a partial or full workflow associated with the one or more identified triggers. The at least one processor configured to execute executing, by the robot, the loaded workflow to perform one or more tasks associated with the one or more triggers.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a graphical user interface (GUI) illustrating an email containing possible dates and times for the user to select, according to an embodiment of the present invention.

FIG. 8 is a GUI illustrating an email reply from an external user, according to an embodiment of the present invention.

DETAILED DESCRIPTION OF THE EMBODIMENTS

Figure 1:
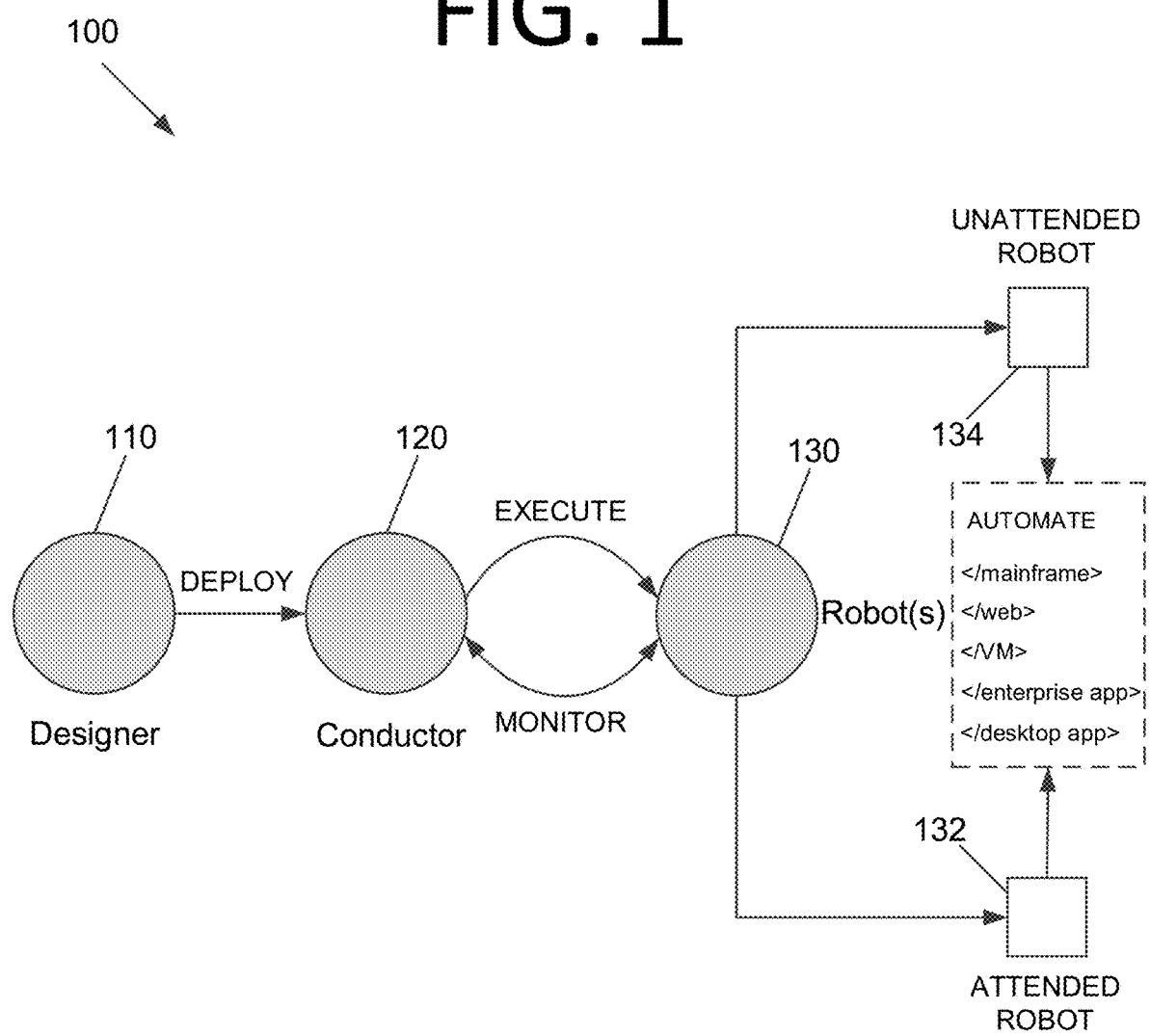
FIG. 1 is an architectural diagram illustrating an RPA system, according to an embodiment of the present invention.

Some embodiments pertain to a digital assistant using RPA. In an embodiment, the digital assistant may perform using artificial intelligence (AI) technology scheduling, expense report processing, time tracking, and electronic messaging on behalf of the user.

In an embodiment, a system includes a plurality of computing devices, where each computing system has a robot that acts as a digital assistant. This robot may receive instructions from a user of the computing device and perform the task requested by the user.

Calendaring

In an embodiment, when a user submits a request to schedule a meeting with another user of another computing device, the robot opens the calendar and communicates with the other computing device to setup and confirm the meeting. For example, the robot sends a calendar request in an email format to the email address of the user on the same or separate email systems. The request includes one or more meeting dates and times available for both the user and the other user. For example, the user may input a date and time for the meeting and identify the other user whom the meeting should be scheduled with.

In another example, the robot communicates directly with another robot of the other user by transmitting a calendar request. The other robot, upon receipt, may display a message to the other user in order for the other user to accept, deny or change the meeting date/time. Depending on the other user's response, the other robot may transmit a reply message, either accepting, denying, or changing the calendar request. Alternatively, the other robot may peruse the other user's schedule to confirm the meeting, deny the meeting and/or suggest an alternative date/time for the meeting.

In yet another example, the user requests the robot to schedule a meeting with the other user without specifying a date and time. In this example, the user's robot reviews the user's calendar prior to scheduling the meeting. Additionally, the user's robot may access a database comprising of previous meetings with the other user to identify a preferred date and time for the meeting. Upon identifying of the meeting, the user's robot communicates with the other user's robot to schedule the meeting, i.e., sends a calendar invite for a proposed date and time.

Expense Reports

In an embodiment, the user instructs the robot to generate an expense report associated with a previous trip. For example, the user uploads one or more receipts to the computing system, and in response, the robot scans the content of the uploaded receipts. During the scanning process, the robot parses out the date of the receipt, the description of the goods/services, and the associated price. The robot may open an expense report template and may input the parsed data to generate the expense report.

Flight Scheduling

In another embodiment, the user may instruct the robot to schedule a flight to a particular destination. In this embodiment, the robot, in response to the request, opens the user's calendar. Based on the user's calendar, the robot will search for flight availability to the particular destination. The robot, upon identifying the flight, may display a message to the user to either accept or deny the proposed flight. In a further embodiment, the robot may provide a list of flight dates and times for the user to select. Depending on the user's response, the robot may schedule the flight to the particular destination. This embodiment is helpful when the user has a meeting with another user at a particular destination and needs to fly to the particular destination in order to attend the meeting. This embodiment may be executed after the calendaring invite.

Communications

In certain embodiments, the robot may be configured to perform additional tasks, such as reviewing communications, and based on keywords, notify the user that a response is required. In another embodiment, the robot may sort email communications in order of importance to the user. The metrics may determine the order of importance, which are preset by the user or are based on historical data compiled based on the user's actions.

Embodiments of the present invention require very little input from the user. For example, the robot may capture data from previous inputs by the user, and may store this data in a machine learning (ML) model. The robot, by using the ML model, may continuously learn and improve when performing a given task.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable for more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments (or bare-bones hardware) and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
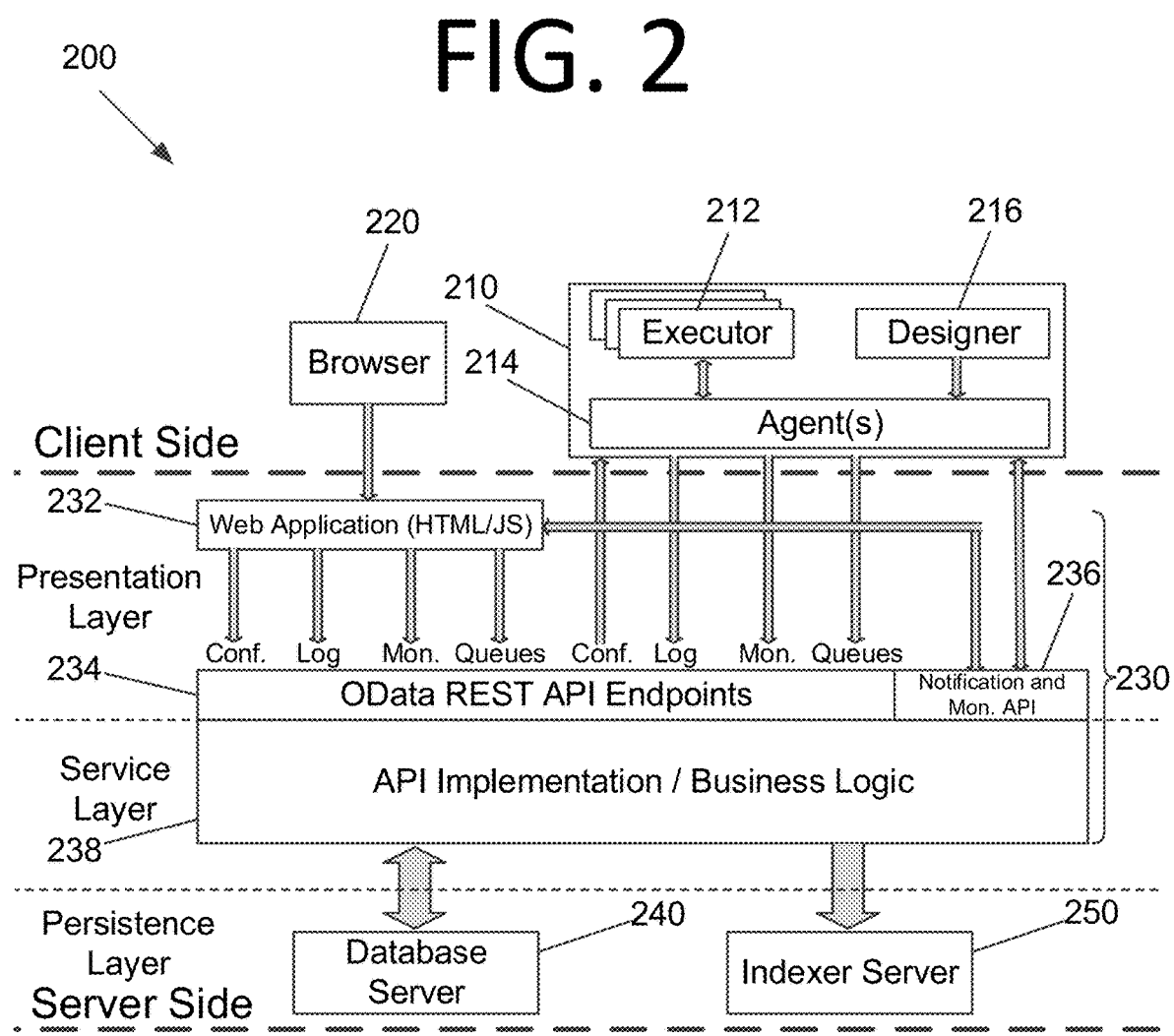
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use Web Socket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
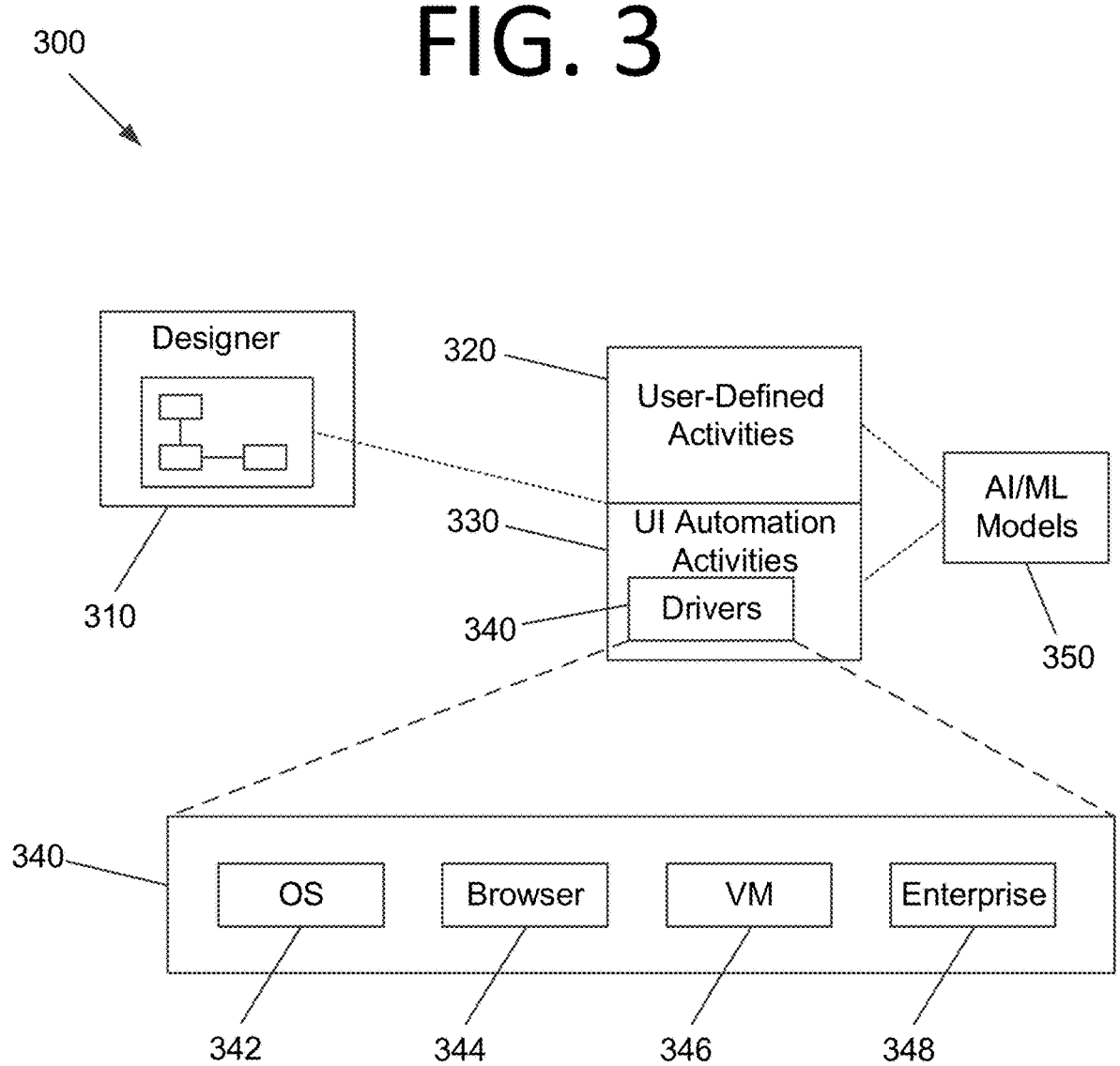
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
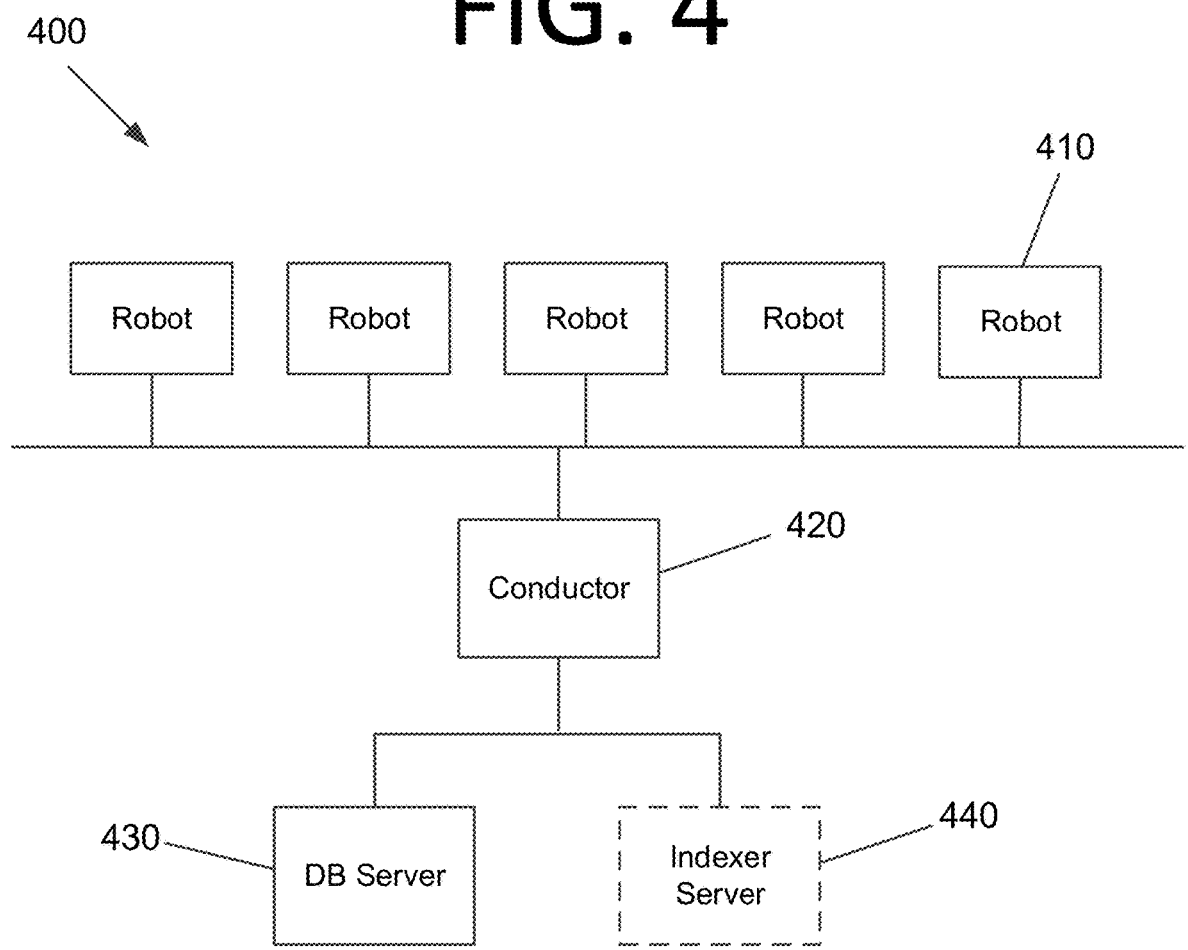
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
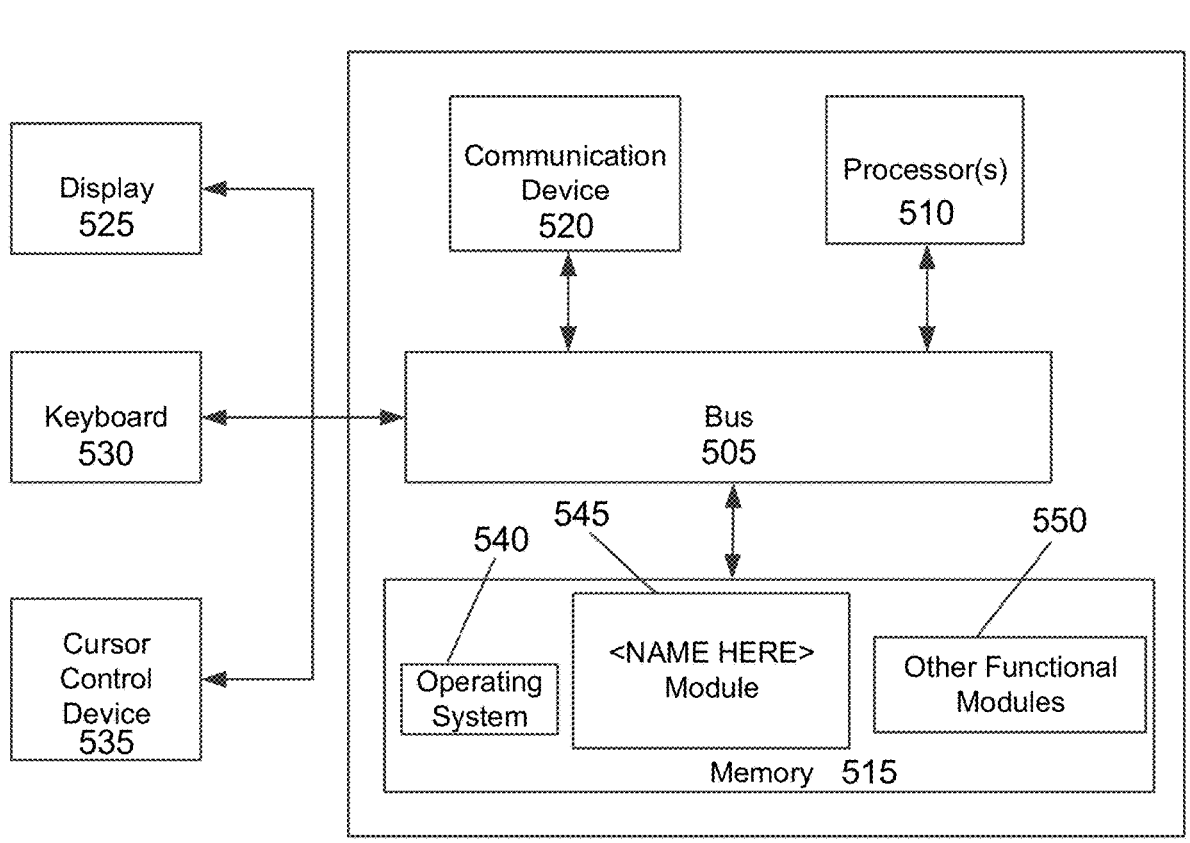
FIG. 5 is an architectural diagram illustrating a computing system configured to perform digital assistant using RPA, according to an embodiment of the present invention.

FIG. 5 is an architectural diagram illustrating a computing system 500 configured to perform digital assistant using RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an RPA digital assistant module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, or any combination thereof, etc. Any localized or distributed architecture may be used without deviating from the scope of the invention.

It should be noted that some of the system features described in this specification have been presented as modules, in order to emphasize their implementation independence more particularly. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
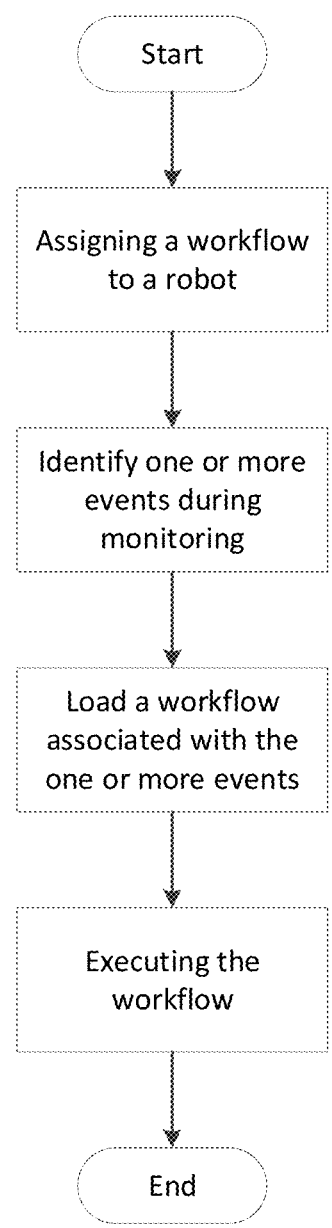
FIG. 6 is a flow diagram illustrating a method for executing one or more tasks using robotic processing automation (RPA), according to an embodiment of the present invention.

FIG. 6 is a flow diagram illustrating a method 600 for executing one or more tasks using robotic processing automation (RPA), according to an embodiment of the present invention. The one or more tasks include calendaring, travel scheduling, expense report generation, and message (e.g., electronic mail) monitoring, to name a few. In some embodiment, method 600 begins at 605 with the user assigning a workflow, such as a personal digital assistant workflow, to a robot. The assignment of the workflow allows for the monitoring of one or more events. In some embodiments, the one or more triggers may be defined as, or may include, scheduling a meeting, scheduling a flight, scheduling a hotel, generating an expense report, re-organizing communications, or any event that would cause a robot to perform an automated task on behalf of the user. At 610, the robot identifies the one or more triggers during the monitoring of the one or more events. At 615, the robot loads a workflow associated with the one or more identified triggers, and at 620, executes the loaded workflow to perform one or more tasks associated with the one or more triggers. The loaded workflow may include a calendaring workflow, a travel scheduling workflow, an expense report generation workflow, and a message (e.g., electronic mail) monitoring workflow, to name a few.

The process steps performed in FIG. 6 may be performed by a computer program, encoding instructions for the processor(s) to perform at least part of the process(es) described in FIG. 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

Calendaring Workflow

In some embodiments, when the calendaring workflow is executed, the robot may populate a graphical user interface (GUI) for the user to enter calendaring information. This information may include a meeting subject line, a proposed date, and a proposed time. The robot uses the information inputted by the user and transmits the request to another user's email account. For example, the robot may send a calendar request in an email format, allowing the other user to accept, deny, or modify the proposed meeting. In some embodiments, however, prior to submitting the calendar request, the robot generate a GUI with the proposed calendar request for the user to accept, deny or modify. In another embodiment, the robot may proceed with transmitting the request with the other user or the other user's robot without the user's involvement.

In embodiments where the user did not input a proposed date and time for the proposed meeting, the robot may review user's electronic calendar to determine user availability. In some further embodiments, the robot may access a database, which includes previous meetings with the other user, other meetings with different users, and so forth. By accessing the database, the robot may use a ML algorithm to determine the users preferred dates/times for conducting the meeting. For example, the robot may determine that the user prefers to schedule meetings in the mornings or late afternoons. Using this data, the robot automatically determines a proposed date and time for the meeting, and then sends the request to the other user's email, allowing the other user to accept, deny, or modify.

In yet another embodiment, the robot may communicate with another robot associated with the other user. In this embodiment, the robot sends the calendar request directly to the robot via a separate communications channel or via email. In embodiments that use emails, the other user's robot may scan the inbox for calendar requests. Regardless of the communication method, the other user's robot may automatically accept, deny, or modify the invite based on the other user's schedule.

In yet an alternative embodiment, the robot may support automatically coordinating a meeting between the user and one or more external users. Such an embodiment would replace functionalities in software applications such as Calendly™. In this embodiment, the user finds it difficult to coordinate or schedule a meeting with people outside of (or external to) his or her organization. In this case, the robot retrieves meeting times that are available for each external user. Upon retrieving the meeting times, the robot constructs an email containing dates and times for the meeting, and sends the email to the user, and in some embodiments, also to the external users. See FIG. 7, which is a GUI 700 illustrating an email containing possible dates and times for the user to select, according to an embodiment of the present invention. In GUI 700, the email instructs the user, and in some embodiments the external users, to respond to the email with an order of preference for dates and times.

The robot, using a listener module, may listen for a reply to this email and may coordinate the meeting in the background. After a predefined period of time has elapsed, or all responses have been handled or retrieved, the robot prompts the user with a calendar invite that is the best for everyone, leaving the user with the option to hit send.

To handle the response, the robot may, in order to intelligently monitor who has responded, require some orchestration to keep track of who has been sent what, and who has responded. This might require orchestrator queues. For example, the robot may keep a log of who has responded and the dates/times that are available of the user and the external user. This may, however, be handled locally if needed. For example, a temporary Excel™ file may be used to handle the state of each reply or non-reply.

In some embodiments, the listener module detects when an email has arrived in the user's inbox. In such an embodiment, the robot parses the response (e.g., email), and compares the response to the originally suggested dates/times. The robot then prompts the user with a created calendar invite for the user to send. See FIG. 8, which is a GUI 800 illustrating an email reply from an external user, according to an embodiment of the present invention.

TABLE 1

System Requirements for Calendaring

| | Requirement |
|---|---|
| 1 | Determine available meeting times for all internal users. |
| 2 | Contact external users with determined internal availability by sending a polished email |
| 3 | Track who has responded to the email sent, and begin scheduling based on either:<br>Everyone has responded<br>Some threshold time has been met (e.g., 12 hours) |
| 4 | Create a draft calendar invite, based on all responses, ready to hit send (e.g., for the user's final sign off) |

Travel Scheduling Workflow

In some embodiments, the robot upon finalizing the schedule on the user's calendar scans the calendared schedule for travel related information. This may include the location of the meeting. For example, when the robot identifies a location outside of the user's home or office location, the robot may load the travel scheduling workflow. Under this workflow, the robot may search for transportation by way of air, rail, or vehicle, and provide the user with options. In another embodiment, the robot may use the user's travel preferences to reserve a flight. For example, the robot identifies, from the user's travel preferences, the preferred airline and hotel. Using this information, the robot access one or more travel webpages and populates the appropriate fields on the one or more travel webpages. The robot may then launch a GUI showing the populated information, allowing the user to secure the reservation. In another embodiment, the robot may secure the reservation without user involvement or input.

Expense Report Generation Workflow

In some embodiments, the user may upload one or more receipts to a receipt folder. The robot, which runs in the background, may detect the uploaded one or more receipts in the receipt folder. The robot scans through each receipt and parses through information contained therein. For example, the parsed information includes vendor information, description of goods or services rendered, and amounts for each item in the receipt, to name a few. Using this parsed information, the robot identifies categories to which the receipts apply to. For example, using the parsed information, the robot identifies whether the receipts relate to a business travel trip. In this example, all receipts related to the business travel trip are sorted by the robot. The robot may then, using optical character recognition, create an expense report and insert the parsed information into the expense report.

In another embodiments, when a user selects the expense report workflow, the robot retrieves the expense report workflow. The robot populates a GUI, allowing the user to upload receipts that have been previously scanned. In another embodiment, the GUI may allow the user to scan and upload the receipts for the robot to analyze. The receipts may be saved in a database. Similar to the above embodiment, once the receipts are saved in the database, the robot access the receipts and parses the data from the receipt. Data includes vendor information, description of goods or services rendered, and amounts for each item in the receipt, to name a few. The robot retrieves an expense report, and populates the fields in the expense report with the data that was parsed. Lastly, the expense report is saved for the user's review and final approval.

Regardless of the embodiment, the robot may send a message to the user for approval. In another embodiment, the robot may generate the expense report without the user's involvement.

Communication Monitoring Workflow

In some embodiments, the robot continuously monitors communications that are sent from, and received by, the user. The robot, for example, may monitor communications on any medium. This may include email communication, Slack™ communication, iMessaging™ and so forth.

As messages are received by the computing device (or mobile device), the robot, which runs in the background, scans through the contents, and in some embodiments, the subject line of the message. Using this scanned information, the robot may identify communications that should have a higher priority. For example, the robot scans the body of the message and identifies any response deadlines. After compiling a list of response deadlines, the robot sorts the communications in order, and assigns a priority number. The robot may then generate a GUI that includes the communications and ranks them in order of importance for the user to select from.

Depending on the embodiment, prior to re-organizing the communications, the robot may send a request to the user for approval or denial of the proposed reorganized communications. In other embodiments, the robot may re-organize the communications without user involvement.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearance of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for executing one or more digital assistant tasks using robotic processing automation (RPA), comprising:
   monitoring, by a robot, one or more user actions and/or events that satisfy one or more triggers, the one or more triggers comprise an event caused by a user action or inaction forcing a robot to perform the one or more digital assistant tasks on behalf of the user;
   loading, by the robot, a partial or full workflow associated with the one or more triggers; and
   executing, by the robot, the loaded workflow to mimic or perform the one or more digital assistant tasks, wherein the robot is a digital assistant running in a background.

2. The computer-implemented method of claim 1, further comprising:
   assigning a workflow to a robot to monitor for one or more user actions or events via one or more triggers, wherein the one or more trigger causes a robot to perform an automated tasks with or without user involvement.

3. The computer-implemented method of claim 2, wherein the robot is assigned with a plurality of capabilities configured to mimic an executive assistant and perform the one or more digital assistant tasks.

4. The computer-implemented method of claim 1, wherein the robot is assigned with pre-defined authority ranging from informative notifications to fully delegated authority.

5. The computer-implemented method of claim 1, further comprising:
   scanning, by the robot, the one or more triggers, wherein the scanning by the robot is performed while one or more applications are being executed on a computing device.

6. The computer-implemented method of claim 1, wherein the executing of the loaded workflow comprises
   executing, by the robot, a series of steps to schedule a meeting on behalf of a user of a computing device, and/or
   executing, by the robot, a series of steps to schedule a travel itinerary on behalf of the user of the computing device based on the scheduled meeting.

7. The computer-implemented method of claim 1, wherein the executing of the loaded workflow comprises
   executing, by the robot, a series of steps to generate or prepare parts of an expense report on behalf of a user of a computing device.

8. The computer-implemented method of claim 1, wherein the executing of the loaded workflow comprises
   executing, by the robot, a series of steps to prioritize and display incoming communications received by a computing device.

9. A computer program embodied on a non-transitory computer-readable medium, the computer program is configured to cause at least one processor to execute one or more digital assistant tasks using robotic processing automation (RPA), the computer program is further configured to cause the at least one processor to
   monitor, by the robot, one or more user actions and/or the events that satisfy one or more triggers, the one or more triggers comprise an event caused by a user action or inaction forcing a robot to perform the one or more digital assistant tasks on behalf of the user;
   load, by the robot, a partial or full workflow associated with the one or more triggers; and
   execute, by the robot, the loaded workflow to mimic or perform the one or more digital assistant tasks, wherein the robot is a digital assistant running in a background.

10. The computer program of claim 9, wherein the computer program is further configured to cause the at least one processor to
    utilize predefined user settings, machine learning (ML) models, and/or inputs from a third party source to complete the one or more digital assistant tasks associated with the one or more triggers.

11. The computer program of claim 9, wherein the at least one processor is further configured to execute the one or more instructions to perform:
    assign a workflow to a robot to monitor for one or more user actions or events via one or more triggers, wherein the one or more trigger causes a robot to perform an automated tasks with or without user involvement.

12. The computer program of claim 9, wherein the robot is assigned with pre-defined authority ranging from informative notifications to fully delegated authority.

13. The computer program of claim 9, wherein the computer program is further configured to cause the at least one processor to
    scan, by the robot, the one or more triggers, wherein the scanning by the robot is performed while one or more applications are being executed on a computing device.

14. The computer program of claim 9, wherein the computer program is further configured to cause the at least one processor to
execute, by the robot, a series of steps to schedule a meeting on behalf of a user of a computing device, and/or
execute, by the robot, a series of steps to schedule a travel itinerary on behalf of the user of the computing device based on the scheduled meeting.

15. The computer program of claim 9, wherein the computer program is further configured to cause the at least one processor to
execute, by the robot, a series of steps to generate an expense report on behalf of a user of a computing device.

16. The computer program of claim 9, wherein the computer program is further configured to cause the at least one processor to
execute, by the robot, a series of steps to prioritize and display incoming communications received by a computing device.

17. A system configured to execute one or more digital assistant tasks using robotic processing automation (RPA), comprising:
memory configured to store one or more computer-executable instructions; and
at least one processor configured to execute the one or more instructions to perform:
monitor, by the robot, one or more user actions and/or the events that satisfy one or more triggers, the one or more triggers comprise an event caused by a user action or inaction forcing a robot to perform the one or more digital assistant tasks on behalf of the user;
load, by the robot, a partial or full workflow associated with the one or more triggers; and
execute, by the robot, the loaded workflow to mimic or perform the one or more digital assistant tasks, wherein the robot is a digital assistant running in a background.

18. The system of claim 17, wherein the at least one processor is further configured to execute the one or more instructions to perform:
utilizing predefined user settings, machine learning (ML) models, and/or inputs from a third party source to complete the one or more digital assistant tasks associated with the one or more triggers.

19. The system of claim 17, wherein the at least one processor is further configured to execute the one or more instructions to perform:
assign a workflow to a robot to monitor for one or more user actions or events via one or more triggers, wherein the one or more trigger causes a robot to perform an automated tasks with or without user involvement.

20. The system of claim 17, wherein the robot is assigned with pre-defined authority ranging from informative notifications to fully delegated authority.

21. The system of claim 17, wherein the at least one processor is further configured to execute the one or more instructions to perform:
scanning, by the robot, the one or more triggers, wherein the scanning by the robot is performed while one or more applications are being executed on a computing device.

22. The system of claim 17, wherein the at least one processor is further configured to execute the one or more instructions to perform:
executing, by the robot, a series of steps to schedule a meeting on behalf of a user of a computing device, and/or
executing, by the robot, a series of steps to schedule a travel itinerary on behalf of the user of the computing device based on the scheduled meeting.

23. The system of claim 17, wherein the at least one processor is further configured to execute the one or more instructions to perform:
executing, by the robot, a series of steps to generate an expense report on behalf of a user of a computing device.

24. The system of claim 17, wherein the at least one processor is further configured to execute the one or more instructions to perform:
executing, by the robot, a series of steps to prioritize and display incoming communications received by a computing device.

25. The computer-implemented method of claim 1, wherein the executing of the loaded workflow comprises
using predefined user settings, machine learning (ML) models, and/or inputs from a third party source to complete the one or more digital assistant tasks associated with the one or more triggers.

26. The computer-implemented method of claim 1, further comprising:
identifying, by the robot, one or more relevant triggers, the one or more relevant triggers are coded in advance or determined by machine learning (ML) or artificial intelligence (AI) to be relevant.

27. The computer program of claim 11, wherein the robot is assigned with a plurality of capabilities configured to mimic an executive assistant and perform the one or more digital assistant tasks.

28. The computer program of claim 9, wherein the at least one processor is further configured to execute the one or more instructions to perform:
identify one or more relevant triggers, the one or more relevant triggers are coded in advance or determined by machine learning (ML) or artificial intelligence (AI) to be relevant.

29. The system of claim 19, wherein the robot is assigned with a plurality of capabilities configured to mimic an executive assistant and perform the one or more digital assistant tasks.

30. The system of claim 17, wherein the at least one processor is further configured to execute the one or more instructions to perform:
identify one or more relevant triggers, the one or more relevant triggers are coded in advance or determined by machine learning (ML) or artificial intelligence (AI) to be relevant.

31. A computer-implemented method for executing one or more digital assistant tasks using robotic processing automation (RPA), comprising:
identifying, by a robot, one or more relevant triggers, the one or more relevant triggers are coded in advance or determined by machine learning (ML) or artificial intelligence (AI) to be relevant;
monitoring, by the robot, one or more user actions and/or events that satisfy the one or more relevant triggers, the one or more triggers comprise an event caused by a user action or inaction forcing a robot to perform the one or more digital assistant tasks on behalf of the user;
loading, by the robot, a partial or full workflow associated with the one or more relevant triggers; and executing, by the robot, the loaded workflow to mimic or perform the one or more digital assistant tasks, wherein the robot is a digital assistant running in a background.

\* \* \* \* \*